(12) United States Patent
Weinstein et al.

(10) Patent No.: US 9,710,342 B1
(45) Date of Patent: Jul. 18, 2017

(54) FAULT-TOLERANT MASTERSHIP ARBITRATION IN A MULTI-MASTER SYSTEM

(71) Applicant: Google Inc., Mountain View, CA (US)

(72) Inventors: Marvin Weinstein, Mountain View, CA (US); Nathan Folkner, Campbell, CA (US); Roy Michael Bannon, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 775 days.

(21) Appl. No.: 14/139,038

(22) Filed: Dec. 23, 2013

(51) Int. Cl.
*G06F 11/20* (2006.01)
*G05B 15/02* (2006.01)
*H04L 12/40* (2006.01)

(52) U.S. Cl.
CPC .......... *G06F 11/2005* (2013.01); *G05B 15/02* (2013.01); *H04L 12/40176* (2013.01)

(58) Field of Classification Search
CPC ......... G05B 15/02; H04B 10/038; G06F 8/61; G06F 8/67; G06F 8/68; G06F 9/441; G06F 9/44505; G06F 9/455; G06F 11/2005; H04L 12/40176
See application file for complete search history.

(56) References Cited

U.S. PATENT DOCUMENTS

| | | | |
|---|---|---|---|
| 4,509,117 A | 4/1985 | Korowitz | |
| 5,742,753 A | 4/1998 | Nordsieck et al. | |
| 5,764,931 A | 6/1998 | Schmahl et al. | |
| 6,370,656 B1 | 4/2002 | Olarig et al. | |
| 6,625,750 B1 * | 9/2003 | Duso | G06F 11/2028 714/11 |
| 6,832,331 B1 * | 12/2004 | Manning | G06F 11/20 714/11 |
| 6,925,516 B2 * | 8/2005 | Struhsaker | H01Q 1/246 361/736 |
| 7,028,218 B2 * | 4/2006 | Schwarm | G06F 11/2038 711/162 |
| 7,069,047 B2 * | 6/2006 | Struhsaker | H04Q 1/10 379/165 |
| 7,421,478 B1 | 9/2008 | Muchow | |
| 7,475,134 B2 * | 1/2009 | Cook | G06F 11/3006 709/213 |
| 7,539,755 B2 * | 5/2009 | Li | G06F 19/3418 709/225 |

(Continued)

OTHER PUBLICATIONS

Administration Guide, Cisco ACE Application Control Engine, Cisco, Chapter 12 only, Sep. 2011.

(Continued)

*Primary Examiner* — Charles Kasenge
(74) *Attorney, Agent, or Firm* — McDermott Will & Emery LLP (57) ABSTRACT

A system and method are provided for controlling mastership among multiple devices in a fault tolerant manner. The devices may be configured to transmit and receive redundant heartbeat signals to indicate the mastership state of the device. The signals may operate in a plurality of configurations including active-master, ready and not-ready. By detecting the signal configuration sent from the other devices, each device is capable of managing its own transitions into and out of mastership in order to ensure that there is one and only one device functioning as master.

20 Claims, 4 Drawing Sheets

(56) References Cited

U.S. PATENT DOCUMENTS

| | | | | |
|---|---|---|---|---|
| 7,620,516 B2* | 11/2009 | Rozenboim | G05B 19/4184 | 702/125 |
| 7,710,242 B2* | 5/2010 | Yamada | G06K 7/10237 | 340/10.1 |
| 7,725,579 B2* | 5/2010 | Cook | G06F 11/3006 | 709/224 |
| 7,738,364 B2* | 6/2010 | Bain | G06F 11/2028 | 370/228 |
| 8,320,894 B1* | 11/2012 | Raghunath | H04M 3/42229 | 370/310.2 |
| 8,509,849 B2* | 8/2013 | Cheon | H04M 1/22 | 455/558 |
| 8,873,377 B2* | 10/2014 | Singatwaria | H04J 3/14 | 370/220 |
| 8,958,414 B1* | 2/2015 | Wong | G08B 21/18 | 370/351 |
| 2002/0097564 A1* | 7/2002 | Struhsaker | H01Q 1/246 | 361/736 |
| 2002/0098869 A1* | 7/2002 | Struhsaker | H01Q 1/246 | 455/561 |
| 2003/0105987 A1* | 6/2003 | Gilbert | G06F 9/4405 | 714/5.11 |
| 2003/0158940 A1* | 8/2003 | Leigh | H04L 67/1008 | 709/226 |
| 2004/0153749 A1* | 8/2004 | Schwarm | G06F 11/2038 | 714/11 |
| 2004/0162927 A1* | 8/2004 | Benson | G06F 13/387 | 710/301 |
| 2004/0168008 A1* | 8/2004 | Benson | G06F 13/409 | 710/306 |
| 2004/0177194 A1* | 9/2004 | Benson | G06F 13/387 | 710/300 |
| 2004/0177198 A1* | 9/2004 | Benson | G06F 13/4095 | 710/301 |
| 2004/0187047 A1* | 9/2004 | Rathunde | H04L 1/22 | 714/25 |
| 2004/0199804 A1* | 10/2004 | Rathunde | G06F 11/0712 | 714/1 |
| 2004/0199806 A1* | 10/2004 | Rathunde | G06F 11/1482 | 714/4.5 |
| 2004/0199811 A1* | 10/2004 | Rathunde | G06F 11/1482 | 714/10 |
| 2005/0022064 A1* | 1/2005 | Steinmetz | G06F 11/0727 | 714/42 |
| 2005/0080895 A1* | 4/2005 | Cook | G06F 11/3055 | 709/224 |
| 2006/0291459 A1* | 12/2006 | Bain | G06F 11/2028 | 370/389 |
| 2007/0250619 A1* | 10/2007 | Li | G06F 19/3418 | 709/224 |
| 2008/0079549 A1* | 4/2008 | Yamada | G06K 7/10237 | 340/10.5 |
| 2008/0233551 A1* | 9/2008 | Doctoroff | G09B 7/02 | 434/352 |
| 2009/0076628 A1* | 3/2009 | Smith | G05B 19/4184 | 700/3 |
| 2009/0077232 A1* | 3/2009 | Cook | G06F 11/3055 | 709/224 |
| 2010/0248782 A1* | 9/2010 | Cheon | H04M 1/22 | 455/558 |
| 2010/0268851 A1* | 10/2010 | Bauman | G06F 11/2007 | 710/11 |
| 2010/0268857 A1* | 10/2010 | Bauman | G06F 11/0745 | 710/74 |
| 2011/0116362 A1* | 5/2011 | Singatwaria | H04J 3/14 | 370/216 |
| 2011/0134749 A1 | 6/2011 | Speks et al. | | |
| 2011/0161538 A1 | 6/2011 | Decker | | |
| 2012/0015621 A1* | 1/2012 | Cerny | H04M 1/72536 | 455/404.2 |
| 2012/0089776 A1* | 4/2012 | Grossman | G06F 3/0625 | 711/114 |
| 2012/0131238 A1* | 5/2012 | Bauman | G06F 11/2007 | 710/38 |
| 2013/0007319 A1* | 1/2013 | Decker | G06F 11/2005 | 710/110 |
| 2013/0107872 A1* | 5/2013 | Lovett | H04L 49/10 | 370/352 |
| 2015/0156140 A1* | 6/2015 | Wong | G08B 21/18 | 370/389 |

OTHER PUBLICATIONS

Administration Guide, Cisco ACE Application Control Engine, Cisco, The Whole Guide, Sep. 2011.

Cisco Application Control Engine Module Administration Guide, Cisco, Chapter 6 only, Oct. 2009.

Cisco Application Control Engine Module Administration Guide, Cisco, The Whole Guide, Oct. 2009.

Jupitor Networks, SRX Series Services Gateways Cluster Deployment Across Layer 2 Networks: Deployment Requirements for High-End SRK Series Layer 2 Cluster Connectivity, pp. 1-10, Copyright 20069.

Product Data Sheet, PCA9541A, 2-to-1 I²C-bus master selector with interrupt logic and reset, pp. 1-42, Rev.4—Aug. 24, 2012.

User Manual, UM10204 I²C-bus specification and user manual, pp. 1-64, Rev. 5—Oct. 9, 2012.

Wikipedia, I²C, pp. 1-15, downloaded Nov. 9, 2013.

\* cited by examiner

FAULT-TOLERANT MASTERSHIP ARBITRATION IN A MULTI-MASTER SYSTEM

BACKGROUND OF THE INVENTION

When a computer system has several devices sharing a resource it may include a mechanism for electing a device to control the remaining devices in order to minimize contention and allow each device an appropriate amount of access to the resource, e.g., master-secondary configuration. This often occurs in, for example, bus architectures, database management and server clusters. The resource shared may be another component device or a communication channel. The component device may be a sensor, peripheral device, storage (e.g., memory, database, hard disc, solid state storage) or other similar device. The communication channel may be, for example, an interconnect bus or a network connection. In order to appropriately control the resource, there may be a device that has mastership. A device or process may have mastership when it has unidirectional or bidirectional control over one or more other devices and initiates and/or coordinates transactions. Some types of master-secondary configurations allow only a single designated device to have mastership whereas others allow multiple devices to be capable of acting as master. In the latter situation, the additional devices capable of functioning as master provide a backup if the need arises, e.g., current master device fails.

BRIEF SUMMARY OF THE INVENTION

Aspects of the disclosure provide a system of controlling mastership, which may include a first management device comprising a first input component and a first output component. The input and output components may each be configured to process three mastership signal configurations, which include an active-mastership configuration, a ready configuration, and a not ready configuration. The active configuration may correspond to a signal with a frequency of 2 MHz, the ready configuration corresponds to a signal with a frequency of 500 KHz and the not ready configuration corresponds to a signal with a frequency of 0 Hz. The system may also include a second management device with input and output components similar to the first management device. The first and second management devices may be within the same chassis, which may also include a first and second communication link between the first and second components. Each of the first and second communication links may be a separate unidirectional electrical circuit through a backplane of a chassis. The management devices may output signals along the first and second communication links. The first output component may output a signal at the same time the first input component is receiving a signal. The first management device may include an FPGA device that includes the first output component and the first input component.

Aspects of the disclosure may also provide a method for controlling devices, which may include transmitting a first signal from a first device and receiving a second signal from the second device. The first and second signals being in one of three configurations. The first configuration indicating that the transmitting device is controlling one or more other devices, the second configuration indicating that the transmitting device is not controlling the one or more other devices and is ready to control the one or more other devices, and the third configuration indicating that the transmitting device is not ready to control the one or more other devices. The first device taking control of the one or more other devices when the second signal changes from the first configuration to either the second configuration or the third configuration. The second device then subsequently changing the first signal to indicate the first configuration.

In another aspect, the first signal is transmitted while the second signal is received. The first signal may be a set of at least two substantially similar first signals transmitted concurrently over two different circuits. The transmitting and receiving of the signals may be performed by an FPGA device. The first signal may: pulse at a rate of 2 KHz to indicate the first configuration; pulse at a rate of 500 kHz to indicate the second configuration; and may have no pulse to indicate the third configuration. The first and second devices may be included in separate management cards that are within the same chassis, and each of the first and second signals traverse a separate unidirectional electrical circuit through a backplane of the chassis. When a device takes control of the one or more devices it may be based on a position value of the first device in a backplane when the first and second device are both controlling the one or more other devices.

Aspects of the disclosure may also provide a system for controlling devices, which may include an output component configured to output: a first output signal indicating that the device is controlling one or more devices; a second output signal indicating that the device is not controlling the one or more devices and is ready to control the one or more devices; and a third output signal indicating that the device is not ready to control the one or more devices. The system may also include an input component configured to receive: a first input signal indicating that another device is controlling the one or more devices; a second input signal indicating that the other device is not controlling the one or more devices and is ready to control the one or more devices; and a third input signal indicating that the other device is not ready to control the one or more devices. The system also including circuitry configured to control the one or more devices based at least in part on a change in the received signal from the first input signal to the second or third input signal.

In another aspect, the devices may be management cards and include an FPGA device that includes the output component and the input component. The output component may be configured to output a signal at the same time the input component is receiving a signal. The output and input signals may traverse separate unidirectional electrical circuits through a backplane of a network switch or router. The signals may pulse at a rate of 2 MHz, the second output signal pulses at a rate of 500 KHz, and the third output single has no pulse. The first, second and third output signals may each be a set of at least two substantially similar signals, each of the signals being transmitted concurrently over a different circuit.

DETAILED DESCRIPTION

In one example, the disclosed method and system may take the form of a fault-tolerant device with dual management cards. Each management card may choose to function as a master or a backup depending on the circumstances. Each management card may be directly connected to the other via a communication link, which may allow each card to detect whether another card is acting as master. The direct connection (e.g., communication link) between the two cards may consist of two pairs of dedicated signal lines connecting FPGA transceivers on each card. The transceivers may be capable of transmitting and receiving heartbeat signals between the two cards. Each transceiver may transmit or output one pair of redundant heartbeat signals over one pair of dedicated signal lines while it receives (e.g., input) a different pair of redundant heartbeat signals over the second pair of dedicated signal lines. Each heartbeat signal being in one of three configurations: 1) an active-mastership configuration, which may correlate to a signal with a 2 MHz frequency, 2) a ready configuration, which may correlate to a signal with a 500 KHz frequency, and 3) a not-ready configuration, which may correlate to a signal with a 0 Hz frequency. Using the heartbeat signals each management card may transition more safely between states so that there is one and only one card acting as master. The above example is just one example of the various aspects of the methods and systems disclosed herein.

Figure 1:
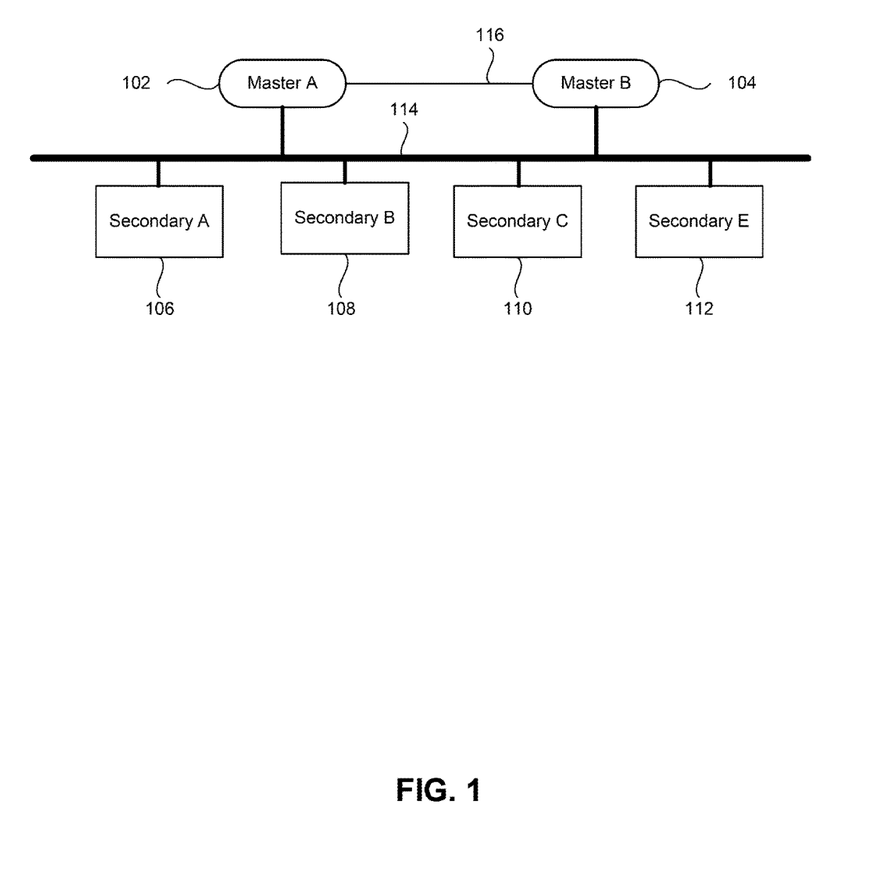
FIG. 1 is a functional diagram of an example of a computing configuration in accordance with aspects of the disclosure.

As shown in FIG. 1, system 100 includes an example master-secondary configuration consisting of devices 102 and 104 and secondary devices 106, 108, 110 and 112. These devices are interconnected through resource bus 114. In addition, there may be a dedicated connection 116 (e.g., communication link) between each of the devices capable of acting as master, e.g., device 102 and 104. This connection may be in addition to a connection shared with other master and secondary devices (e.g., resource bus 114). Dedicated connection 116 may propagate signals that relate only to the arbitration of mastership. Dedicated connection 116 (e.g., communication link) may include a plurality of unidirectional links wherein one signal or a plurality of signals can concurrently propagate the dedicated connection in one direction only, e.g., only from master device 102 to master device 104, or only from master device 104 to master device 102. Alternatively, it may be a bidirectional link that allows a signal, or multiple signals, to propagate the connection in each direction. In one example, dedicated connection 116 may include a dedicated circuit in which an electric or electromagnetic signal can traverse. The dedicated circuit may span a single substrate, such as an integrated circuit or Printed Circuit Board (PCB), or it may span multiple substrates including one or more backplanes across a chassis (e.g., server, switch or router) or one or more chassis (e.g., between servers, switches or routers).

Dedicated connection 116 may be used to send and receive signals for the purpose of designating one device as the master. The signal configurations may include Active-Master configuration, Ready configuration and Not-Ready configuration. Active-Master configuration may indicate that the device has been designated as the master and may control at least one of the secondary devices. Ready configuration may indicate that the device has been designated as a backup that is ready and capable of acting as master when the need arises. A signal in the Not-Ready configuration indicates that the device is not yet ready to function as either a master or a backup, which may occur when the device is initializing (e.g., booting).

Devices 102 and 104 may transition between states based on the signal configurations and thus may gain or lose mastership for a variety of reasons. Device 102, which may be currently functioning as master may lose mastership if, for example, it is reset, loses power or has been removed from the system (e.g., hot-swapped). When this occurs, device 104, which is not functioning as master (e.g., emitting a signal in the Not-Ready configuration) may detect the current master has stopped functioning correctly and may gain mastership.

Master devices 102 and 104 may each be configured to detect the current operation of the other device based on the configuration of the signals it receives from the other device (e.g., remote device). By way of example only, each signal may be encoded with information based on its configuration or the existence of the signal itself may represent a signal configuration. The signal may be an analog signal or a digital signal or a combination of both, for example, a digital signal encoded into an analog carrier signal. By further way of example only, signal may take the form of an electrical signal, an acoustic signal or an electromagnetic signal (e.g., optical, infrared or radio wave).

In one example, the signal may be a toggling encoded signal, which may increase fault detection, i.e., a signal that alternates between a high and low state. If the transmitting component were to malfunction, it may result in a signal being stuck at a particular logical state (e.g., constant high or low state). The toggle signal may be used to decrease the likelihood that a constant, errant signal is misinterpreted as an accurate representation of the state of the device.

In one aspect, a master-capable device 102 or 104 may generate a signal that indicates whether the device is operating normally, e.g., a heartbeat signal. If a heartbeat signal from device 104 is missing for a duration of time, the other device 102 may conclude that device 104 has failed or is no longer functioning correctly. The duration of time to wait before interpreting the missing signal as a failure may reflect a duration of time that is short enough to react relatively quickly to failures but is not so short that minor variations in the signal generate an unacceptable number of false indications of failure. In one example, such amount of time may be a fixed duration of time or may relate to a property of the signal such as the speed, frequency or reliability of the signal. In another example, the predetermined amount of time may be inversely proportional to the signal frequency, so the higher the frequency of the signal the smaller the predetermined amount of time. In this case, the predetermined amount of time may be approximately equivalent to missing 10 signal pulses. In that case, a signal with a frequency of 2 MHz would have 2 million pulses per second and thus each pulse would be 500 nanoseconds apart; the amount of time would thus be 5 microseconds. On the other hand, if the signal were 500 KHz, using a duration of 10 signal pulses would result in the amount of time being 20 microseconds. By way of further example, the predetermined amount of time may be based on any quantity of missed pulses between 1 and 100 (e.g., 1, 2, 3, 5, 15). It may also be an explicit duration of time in the range of 1 microsecond to 10 milliseconds (e.g., 1, 5, 15, 25, 50 microseconds). Yet further, the amount of time may be dynamically determined and changed over time. For example, master device 102 or 104 may dynamically determine that the current duration has resulted in one or more false indications of failure and based on this historical analysis it may increase the duration.

As discussed above, the signal configuration may correspond to a frequency of an electrical signal. In this situation, each of the three configurations of operation may correspond to a signal at a different frequency. The frequency may be a specific frequency or within a predetermined range of frequencies. The selection of the frequencies may be based on the ability of the equipment to generate, propagate and reliably distinguish a signal as being within one of the three configurations. The predetermined frequency may also be based on the performance needs of the system. If the system requires a faster failure response time, a higher frequency may be used. On the other hand, if power is a concern the system may use lower frequencies, which may require less energy to generate and/or propagate.

In one example, the Active-Mastership configuration may correspond to a high frequency signal and the Ready configuration may correspond to a low frequency signal. The Not-Ready configuration, in turn, may correspond with a non-frequency signal, e.g., a static signal that stays at a constant value (e.g., logical 1 or 0) so that the frequency is approximately equal to 0. The non-frequency signal may also be represented by the absence of a signal, wherein the signal is not generated and/or is not received.

The breadth of each frequency range may depend on the type of signal being used. For example, if it is an electrical signal the high frequency configuration may be a value or range of values between 1-3 Mhz. The low frequency configuration may be a value or range of values between 100 KHz and 999 KHz. In one example, the Active-Master configuration, Ready configuration and Not-ready configuration may correlate to signal frequencies similar to 2 MHz, 500 KHz and 0 hz respectively.

In another example, any or all of the signals may be electromagnetic signals (e.g., optical or infrared). The electromagnetic signals may be in the range of 430-790 Terahertz (THz) (i.e., visible light). For example, the Active-Master configuration may correspond to 606-668 THz (e.g., blue light) and the Not-Ready Configuration may correspond to 400-484 THz (e.g., red light). The Ready configuration may be the absence of a signal.

Devices 102 or 104 may each be configured to transmit or output duplicate signals and receive duplicate signals (e.g., redundant input). Each signal in the set of duplicate signals may be transmitted over a separate physical connection (e.g., different circuit) so that no single connection carries both duplicates. Each of the duplicate signals may be substantially similar to its respective duplicate. For example, substantially similar signals may have substantially similar frequencies, amplitudes, phases and/or voltages. The signals may also have substantially the same timing, e.g., each of the respective duplicate signals are transmitted at the substantially the same time and received at substantially the same time. In one aspect, the signals are considered substantially similar when their differences are not greater than the minor variations that are expected to occur when device 102 or 104 is operating properly. In addition to sending duplicate signals, each device 102 or 104 may be configured to transmit signals and receive signals concurrently.

Devices 102 and 104 may each include a transmitter for generating a signal at the predefined signal configuration and a receiver for interpreting the incoming signal. The transmitter and receiver may each be its own component or both the transmitter and receiver may be handled by the same component, e.g., a transceiver. In one example, the component may include one or more programmable devices, for example, Programmable Logic Devices (PLD), Field Programmable Gate Arrays (FPGA), Application Specific Integrated Circuits (ASIC), discrete logic running within a processor's firmware, instructions running on a general processor, or some combination of the aforementioned circuitry and/or instructions. The component (e.g., programmable device) may have analog and/or digital signaling channels or may have integrated peripheral analog-to-digital and/or digital-to-analog converters.

Figure 2:
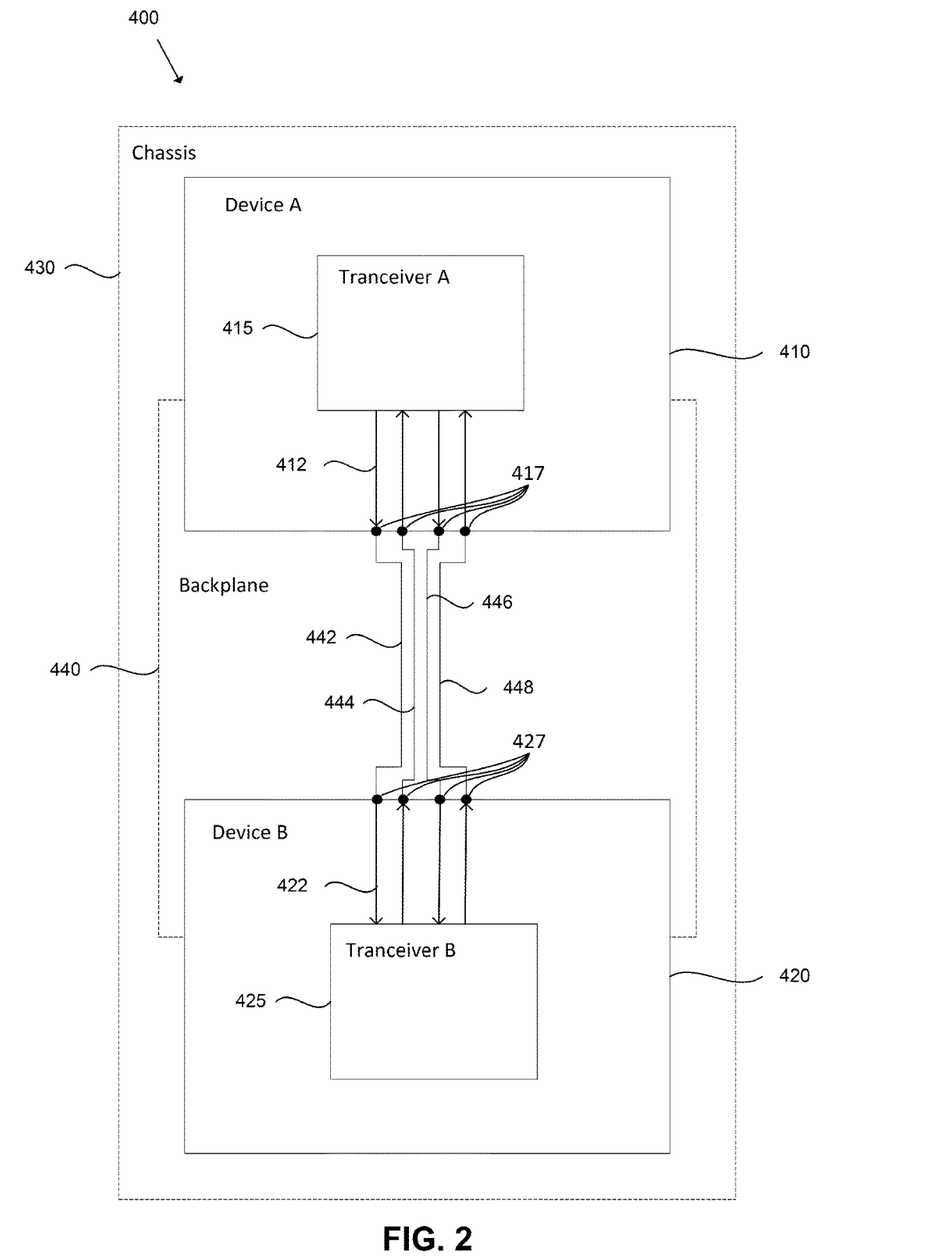
FIG. 2 is a hardware schematic in accordance with aspects of the disclosure.

As shown in FIG. 2, system 400 includes devices 410 and 420 (e.g., network management cards) within a chassis 430 of a networking device. Each device 410 and 420 may be equipped with a component 415 and 425 respectively (e.g., FPGA transceiver), which may be configured to transmit (e.g., output) duplicate signals and receive duplicate signals (e.g., input). Devices 410 and 420 may be interconnected via a plurality of unidirectional dedicated circuits that span backplane 440. Each unidirectional dedicated circuit may comprise a plurality of intermediate electrical connections. One electrical connection may traverse device 410 (e.g., network management card) from component 415 (e.g., FPGA) to coupler 412 (e.g., pin connector). Coupler 412 (e.g., pin connector) may lie at an edge of device 410 (e.g., network management card) and may be connected to backplane 440 at a designated slot. The unidirectional dedicated circuit may also include connection 442 (e.g., signal line or trace) that spans a portion of backplane 440 and may connect to coupler 427 (e.g., pin connector) at another slot, which may then connect to component 425 (e.g., FPGA) via electrical connection 422. Each of the other unidirectional dedicated circuit may also comprise a similar plurality of intermediate electrical connections each including one of electrical connections 444, 446, 448 and its respective connections between components 415 and 425 (e.g., FPGAs).

Each of the unidirectional dedicated circuits may transmit or receive a signal, for example, unidirectional dedicated circuits 442 and 446 may each propagate a signal being transmitted from device 410, whereas unidirectional dedicated circuits 444 and 448 may each propagate a signal received by device 410. In one example, each signal in the set of duplicate signals may be transmitted over a separate physical connection (e.g., different circuit) so that no single connection carries more than one signal from the same set of duplicate signals. Multiple redundant and physically separated signals may provide additional fault-tolerance in the event two signal lines both become damaged.

At any one instant in time there may be four signals, each travelling over one of the four unidirectional dedicated circuits. In an alternate embodiment, the dedicated connection may include one or more bidirectional dedicated connections. Each bidirectional connection may allow signals to propagate between device 410 and 420 in both directions simultaneously. In this situation, one bidirectional connection may propagate a signal from each set of duplicate signals and the second connection may propagate different signal from the same sets of duplicate signals.

Figure 3:
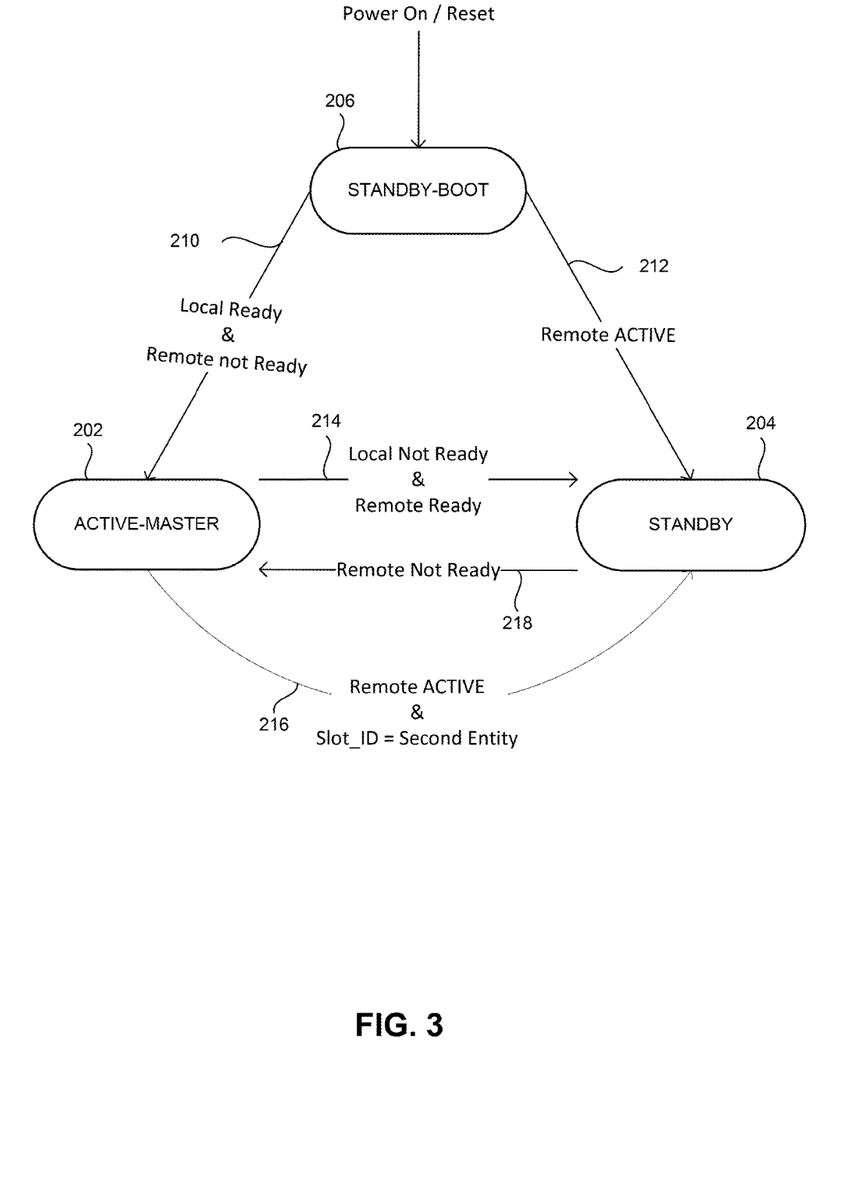
FIG. 3 is a state diagram illustrating example transitions between mastership states in accordance with aspects of the disclosure.

FIG. 3 is a state diagram illustrating the operating states of a master-capable device and the circumstances in which the device will transition between states. As shown in FIG. 3 there may be three operating states for each mastership capable device, namely Active-Mastership state 202, Standby state 204, and Standby-Boot state 206. Some example transitions are transitions 210, 212, 214, 216, 218 and 220. Each transition may be based on the state of the remote device (e.g., incoming signal configuration) as well as the state of the local device. Although the system has only one designated master when the system is operating in its intended normal state, both the remote device and the local device are capable of functioning as a master. As discussed above, each device may receive a signal from the remote device that may be used to determine whether the local device should transition to a different state.

When a device is initially reset or powered on, the device may enter Standby-Boot state 206. During this state, the FPGA may wait a short amount of time, for example, long enough such that any remote input signals are expected to have been received by the local FPGA. The FPGA may then continuously monitor the incoming remote signals. Upon receiving a signal from the remote device, it may analyze the signal and use it to determine whether it should transition to another state and, if so, it may transition to the applicable state. As shown in transition 210, if the received signal indicates the remote device is not active when the local device becomes ready (e.g., completes its initialization), the local device may transition to the Active-Master state 202 and acquire mastership. However, as shown in transition 212, if the remote device is already active when the local device becomes ready, it may transition to Standby state 204.

When a device is operating in either Standby state 204 or Active-Master state 202 it may transition to Standby-Boot state 206 if any of the following situations occur: a hot-swap, a reset or expiration of a restart timer. A hot-swap may be initiated by pressing a button on a front panel of the chassis for 3 seconds. Once pressed, the device may not automatically perform a transition; instead, it may generate an interrupt and determine whether the remote device is ready to take on mastership. If the remote device is ready (e.g., local device receiving a signal in the ready configuration) it may initiate a mastership switchover between the two devices. Another option is a reset, which may be either a soft reset (e.g., software reset or warm reset) in which only the software is re-initialized or a hard reset (e.g., hardware rest) in which case both the hardware and software are re-initialized. In another instance, the device may transition from Active-Master state 202 to Standby-Boot state 206 upon the expiration of a timer. The device may include one or more timer mechanisms for detecting and recovering from a malfunction e.g., a watchdog timers. In one example, the device may have a component that regularly restarts a timer during normal operation. If a fault occurs within the component, the component may fail to reset or restart the timer. This failure may be detected when the timer expires, causing a timeout signal to be generated and corrective action to occur. The corrective action may be for the device to transition to Standby-Boot state and reset itself.

As discussed above there are several instances where a device will transition out of Active-Mastership state 202 which may result in the system having no master. When this occurs, the remote device, which may be operating in Standby state 204, may detect the change in the signal configuration of the local device (e.g., Active configuration to Not-Ready configuration). In response, the remote device may transition to Active-Master state 202, as shown in transition 218.

When a device is operating in Active-Master state 202, it may transition to Standby state 204 via transition 214 or 216. Transition 214 may occur when the local device detects that it is no longer capable of functioning as master and the remote device is ready (e.g., local device is receiving a signal in the Ready configuration). Transition 216 relates to failsafe logic or an error case. This transition may occur when both the local and remote device are in the Active-Master state, which is unfavorable dual mastership situation. For example, the situation may arise from a pair of dedicated connections being broken (e.g., both pins bent). Upon detection of a dual mastership situation (e.g., both devices in Active-Master state), a device's position in the backplane (e.g., slot ID) may be used by default to designate the device that should continue as the master and the device(s) that should transition out of the master state. If the device's slot ID indicates that the device is in a lower position (e.g., slot #1), the device will stop being master and transition to the Standby state. If the device's slot ID indicates that the device is in a higher position (e.g., slot #2) it will continue to be master and remain in the Active-Master state. In an alternate example, the device in the lower position may continue to be master and the device in the higher position may stop being master (e.g., transition to Standby State 204).

Figure 4:
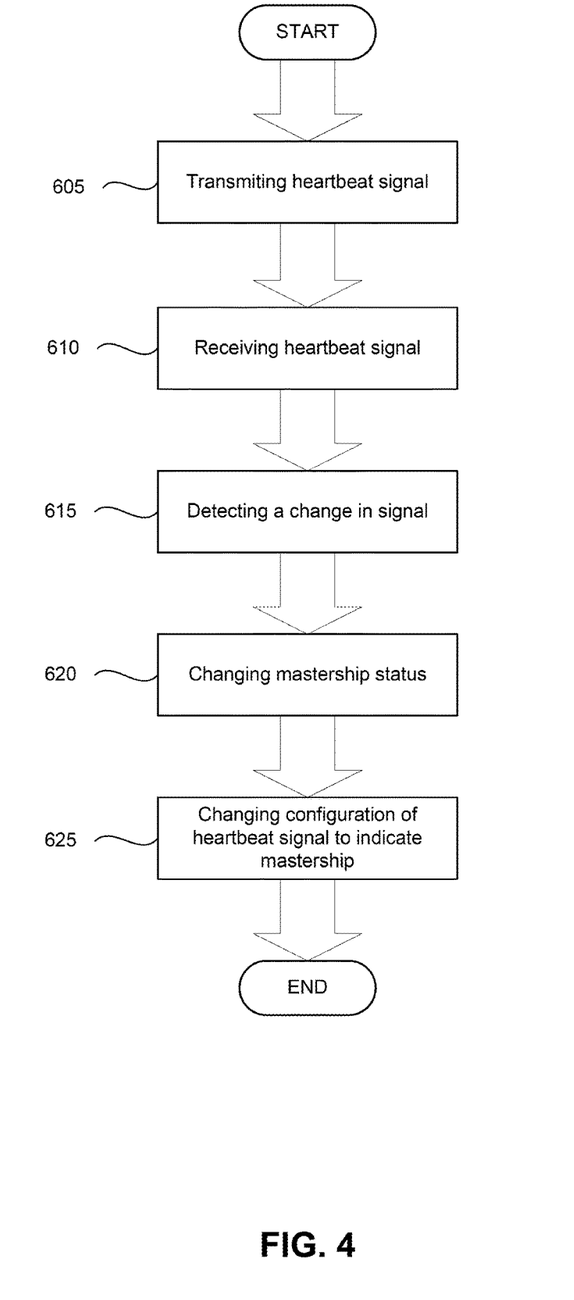
FIG. 4 is a flow diagram illustrating example method steps in accordance with aspects of the disclosure.

FIG. 4 is a flow diagram of one manner in which mastership may be arbitrated. As shown in step 605, the local device transmits a heartbeat signal to the remote device, which may represent the state of the local device. While the local device is transmitting the heartbeat signal, it may also receive a heartbeat signal from the remote device as shown in step 610. The local device may then continuously monitor the received signal to detect a change, which may indicate a change in the mastership state of the remote device. In step 615, the local device detects a change in the received signal from the remote device and analyzes it to discover if the remote device is ready for mastership. As shown in step 620, if the remote device is no longer transmitting a signal in the Active configuration, the local device will change its state and take over mastership. The local device will then change the configuration of its heartbeat signal and transmit it to the remote device to indicate it has taken mastership.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for controlling devices, comprising:
   transmitting from a first device to a second device a first signal having a first frequency indicating a first device configuration, a second frequency indicating a second device configuration, or a third frequency indicating a third device configuration, wherein the first, second, and third frequencies are different from one another;
   receiving at the first device from the second device a second signal having the first frequency indicating the first device configuration, the second frequency indicating the second device configuration, or the third frequency indicating the third device configuration, wherein:
   the first device configuration is a configuration in which the device is controlling one or more other devices, the second device configuration is a configuration in which the device is not controlling the one or more other devices and is ready to control the one or more other devices, and the third device configuration is a configuration in which the device is not ready to control the one or more other devices;
   taking control of the one or more other devices, by the first device, when the configuration indicated by the second signal changes from the first device configuration to either the second device configuration or the third device configuration; and changing the first signal to indicate the first configuration.

2. The method of claim 1, wherein the first signal is transmitted while the second signal is received.

3. The method of claim 1, wherein the first signal comprises a set of at least two substantially similar first signals transmitted concurrently over a first and a second circuit respectively, the first circuit being different from the second circuit.

4. The method of claim 1, wherein transmitting the first signal and receiving the second signal are performed by an FPGA device.

5. The method of claim 1, wherein the first frequency is about 2 MHz, the second frequency is about 500 KHz, and the third frequency is about 0 Hz.

6. The method of claim 1, wherein each of the first and second devices are included in a separate network management card within the same chassis, and each of the first and second signals traverse a separate unidirectional electrical circuit through a backplane of the network switch or router.

7. The method of claim 1, wherein taking control of the one or more devices is based on a position value of the first device in a backplane when the first and second device are both controlling the one or more other devices.

8. A system for controlling devices, comprising:
an output component of a first device configured to output to an input component of a second device: a first output signal indicating that the first device is controlling one or more other devices, a second output signal indicating that the first device is not controlling the one or more other devices and is ready to control the one or more other devices, and a third output signal indicating that the first device is not ready to control the one or more devices;
an input component of the first device configured to receive from an output component of the second device: a first input signal indicating that the second device is controlling the one or more other devices, a second input signal indicating that the second device is not controlling the one or more other devices and is ready to control the one or more other devices, and a third input signal indicating that the second device is not ready to control the one or more other devices; and
circuitry configured to control the one or more other devices based at least in part on the detection of a change in a signal received at the input component of the first device, the change being from the first input signal to the second or third input signal,
wherein the first input signal and first output signal have a first frequency, the second input signal and the second output signal have a second frequency, the third input signal and third output signal have a third frequency, and the first, second, and third frequencies are different from one another.

9. The system of claim 8, wherein the output component of the first device is configured to output a signal at the same time the input component of the first device is receiving a signal.

10. The system of claim 8, wherein the first, second and third output signals each comprise a set of at least two substantially similar signals, each of the substantially similar signals being transmitted concurrently over a different circuit.

11. The system of claim 8, further comprising an FPGA device that includes the output component of the first device and the input component of the first device.

12. The system of claim 8, wherein the first frequency is about 2 MHz, the second frequency is about 500 KHz, and the third frequency is about 0 Hz.

13. The system of claim 8, wherein the first device comprises a management card and the one or more other devices are within a network switch or router.

14. The system of claim 8, wherein the output signals and the input signals traverse separate unidirectional electrical circuits through a backplane of a network switch or router.

15. A system of controlling mastership comprising:
a first management device comprising a first input component and a first output component, the first output component configured to output to a second input component three mastership signals and the first input component configured to receive from a second output component the three mastership signals, wherein the three mastership signals indicate an active configuration, a ready configuration, and a not ready configuration, respectively, and the each of the three mastership signals has a different pulse frequency than the other two mastership signals;
a second management device comprising the second input component and the second output component, the second output component configured to output to the first input component the three mastership signals and the second input component configured to receive from the first output component the three mastership signals;
a first communication link between the first output component and the second input component; and
a second communication link between the first input component and the second output component.

16. The system of claim 15, wherein the first and second management devices output the three mastership signals along the first and second communication links, wherein the first output component outputs one of the three mastership signals at the same time the first input component is receiving one of the three mastership signals.

17. The system of claim 15, wherein the first management device includes an FPGA device that includes the first output component and the first input component.

18. The system of claim 15, wherein the active configuration corresponds to a mastership signal with a frequency of about 2 MHz, the ready configuration corresponds to a mastership signal with a frequency of about 500 KHz and the not ready configuration corresponds to a mastership signal with a frequency of about 0 Hz.

19. The system of claim 15, wherein the first and second management devices are within the same chassis.

20. The system of claim 15, wherein each of the first and second communication links is a separate unidirectional electrical circuit through a backplane of a network switch or router.

* * * * *